(12) United States Patent
Tour

(10) Patent No.: US 7,516,723 B2
(45) Date of Patent: *Apr. 14, 2009

(54) DOUBLE PISTON CYCLE ENGINE

(75) Inventor: Benjamin H. Tour, San Diego, CA (US)

(73) Assignee: Tour Engine, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/040,804

(22) Filed: Feb. 29, 2008

(65) Prior Publication Data

US 2008/0141956 A1 Jun. 19, 2008

Related U.S. Application Data

(63) Continuation of application No. 11/371,827, filed on Mar. 9, 2006, now Pat. No. 7,383,797.

(60) Provisional application No. 60/661,195, filed on Mar. 11, 2005.

(51) Int. Cl.
F01B 7/14 (2006.01)
F02B 25/00 (2006.01)
(52) U.S. Cl. .................. 123/51 BA; 123/71 R
(58) Field of Classification Search ............ 123/51 AA, 123/51 BA, 70 R, 71 R, 53.6, 66, 69 R, 70 V, 123/71 V
See application file for complete search history.

(56) References Cited

U.S. PATENT DOCUMENTS

| 982,850 | A | | 1/1911 | Noyes | |
|---|---|---|---|---|---|
| 1,139,713 | A | | 5/1915 | Osterman | |
| 1,369,511 | A | | 2/1921 | Wiesner | |
| 1,372,216 | A | | 3/1921 | Casaday | |
| 1,535,423 | A | * | 4/1925 | Latta | ........................ 123/69 R |
| 1,633,921 | A | | 6/1927 | Burtnett | |
| 2,169,807 | A | | 8/1939 | Lyon | |
| 3,069,915 | A | | 12/1962 | Sawle, Jr. | |
| 3,143,282 | A | | 8/1964 | King et al. | |
| 3,221,718 | A | * | 12/1965 | Isley | ........................ 123/41.35 |
| 3,623,463 | A | | 11/1971 | DeVries | |
| 3,675,630 | A | * | 7/1972 | Stratton | ..................... 123/70 R |
| 3,805,752 | A | | 4/1974 | Cataldo | |

(Continued)

OTHER PUBLICATIONS

International Search Report for PCT/US06/14426, mailed on Sep. 25, 2007, 1 page.

(Continued)

*Primary Examiner*—Noah Kamen
(74) *Attorney, Agent, or Firm*—Morrison & Foerster LLP

(57) ABSTRACT

A Dual Piston Cycle Engine utilizes a unique dual piston apparatus that includes: a first cylinder housing a first piston therein; a second cylinder thermally isolated from the first cylinder and housing a second piston therein; an intake valve coupled to the first cylinder for allowing a fuel mixture to enter into the first cylinder; an exhaust valve coupled to the second cylinder for allowing an exhaust gas to exit the second cylinder; and an interstage valve that couples an internal chamber of the first cylinder to an internal chamber of the second cylinder and configured to minimize dead space between the first and second cylinders, wherein the first piston performs only intake and compression strokes and the second piston performs only combustion and exhaust strokes and the first and second cylinders are thermally isolated from one another.

21 Claims, 16 Drawing Sheets

U.S. PATENT DOCUMENTS

| | | | |
|---|---|---|---|
| 3,808,818 A | | 5/1974 | Cataldo |
| 3,880,126 A | * | 4/1975 | Thurston et al. .......... 123/70 R |
| 3,959,974 A | | 6/1976 | Thomas |
| 3,991,721 A | | 11/1976 | Hurd |
| 4,040,400 A | | 8/1977 | Kiener |
| 4,157,080 A | | 6/1979 | Hill |
| 4,159,700 A | | 7/1979 | McCrum |
| 4,202,300 A | | 5/1980 | Skay |
| 4,359,017 A | | 11/1982 | May |
| 4,565,167 A | | 1/1986 | Bryant |
| 4,635,590 A | | 1/1987 | Gerace |
| 4,787,343 A | | 11/1988 | Tuckey |
| 5,072,589 A | | 12/1991 | Schmitz |
| 5,265,564 A | | 11/1993 | Dullaway |
| 5,431,130 A | | 7/1995 | Brackett |
| 5,546,897 A | | 8/1996 | Brackett |
| 5,623,894 A | | 4/1997 | Clarke |
| 5,857,436 A | | 1/1999 | Chen |
| 6,095,100 A | | 8/2000 | Hughes |
| 6,318,310 B1 | | 11/2001 | Clarke |
| 6,340,004 B1 | | 1/2002 | Patton |
| 6,543,225 B2 | | 4/2003 | Scuderi |
| 6,553,977 B2 | | 4/2003 | Schmitz |
| 6,722,127 B2 | | 4/2004 | Scuderi et al. |
| 6,789,514 B2 | | 9/2004 | Suh et al. |
| 6,796,127 B2 | | 9/2004 | Helm |
| 6,880,501 B2 | | 4/2005 | Suh et al. |
| 6,918,358 B2 | | 7/2005 | Hu |
| 2003/0014971 A1 | | 1/2003 | Scuderi |
| 2003/0015171 A1 | | 1/2003 | Scuderi |
| 2003/0192489 A1 | | 10/2003 | Singh |
| 2004/0016234 A1 | | 1/2004 | Chomiak |
| 2005/0016475 A1 | | 1/2005 | Scuderi et al. |
| 2005/0076863 A1 | | 4/2005 | Baba et al. |
| 2005/0199191 A1 | | 9/2005 | Loth et al. |

OTHER PUBLICATIONS

Written Opinion of the International Searching Authority for PCT/US06/14426, mailed on Sep. 25, 2007, 5 pages.

International Search Report and Written Opinion for PCT/US06/08526, mailed Apr. 22, 2008, 8 pages.

* cited by examiner

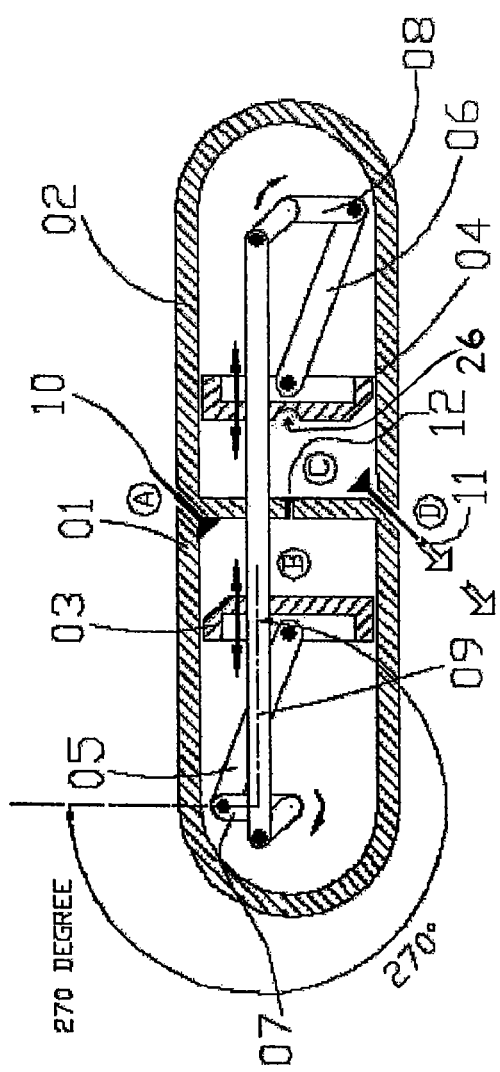
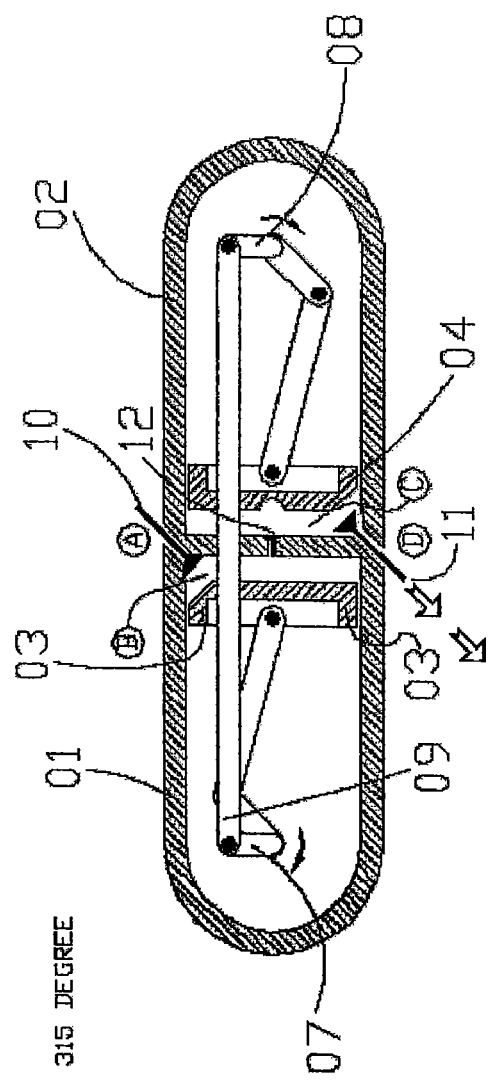

DOUBLE PISTON CYCLE ENGINE

RELATED APPLICATIONS

The present application is a continuation of U.S. patent application Ser. No. 11/371,827, entitled "DOUBLE PISTON CYCLE ENGINE", filed on Mar. 9, 2006 now U.S. Pat. No. 7,383,797, the entirety of which is incorporated by reference herein, and which claims the benefit of priority under 35 U.S.C. § 119(e) to U.S. provisional application Ser. No. 60/661,195 entitled "DOUBLE PISTON CYCLE ENGINE," filed on Mar. 11, 2005, the entirety of which is incorporated by reference herein.

BACKGROUND OF THE INVENTION

1. Field of the Invention

The present invention relates generally to internal combustion engines and, more specifically, it relates to a double piston cycle engine (DPCE) that is more efficient then conventional combustion engines.

2. Description of the Related Art

It can be appreciated that internal combustion engines are ubiquitous today and have been in use for over 100 years. Typically, an internal combustion engine includes one or more cylinders. Each cylinder includes a single piston that performs four strokes, commonly referred to as the intake, compression, combustion/power, and exhaust strokes, which together form a complete cycle of conventional pistons.

The main problem with a conventional internal combustion engine is low fuel efficiency. It is estimated that more than one half of the potential fuel thermal energy created by conventional engines dissipates through the engine structure without adding any useful mechanical work. A major reason for this thermal waste is the essential cooling requirements of conventional engines. The cooling system (e.g., radiator) alone dissipates heat at a greater rate and amount than the total heat actually transformed into useful work. Another problem with conventional internal combustion engines is their inability to increase efficiencies while using heat regeneration or recycling methods to provide higher combustion temperatures.

Another reason why conventional engines suffer from efficiency problems is that the high-temperature in the cylinder during the intake and compression strokes makes the piston work harder and, hence, less efficient during these strokes.

Another disadvantage associated with existing internal combustion engines is their inability to further increase combustion temperatures and compression ratios; although theoretically raising chamber temperatures during the power stroke and increasing compression ratios would have improve efficiencies.

Another problem with conventional engines is their incomplete chemical combustion process causing harmful exhaust emissions.

While these devices may be suitable for the particular purpose to which they address, they are not as efficient as the proposed DPCE that utilizes temperature differentiated dual cylinders that divide the conventional four strokes of a piston into two low temperature strokes (intake and compression) and two high temperature strokes (power and exhaust), performed by each of the respective dual pistons.

Although others have previously disclosed dual-piston combustion engine configurations, none provide the substantial efficiency and performance improvements of the present invention. For example, U.S. Pat. No. 1,372,216 to Casaday discloses a dual piston combustion engine in which cylinders and pistons are arranged in respective pairs. The piston of the firing cylinder moves in advance of the piston of the compression cylinder. U.S. Pat. No. 3,880,126 to Thurston et al. discloses a two-stroke cycle split cylinder internal combustion engine. The piston of the induction cylinder moves somewhat less than one-half stroke in advance of the piston of the power cylinder. The induction cylinder compresses a charge, and transfers the charge to the power cylinder where it is mixed with a residual charge of burned products from the previous cycle, and further compressed before igniting. U.S. Pat. Application No. 2003/0015171 A1 to Scuderi discloses a four-stroke cycle internal combustion engine. A power piston within a first cylinder is connected to a crankshaft and performs power and exhaust strokes of the four-stroke cycle. A compression piston within a second cylinder is also connected to the crankshaft and performs the intake and compression strokes of the same four-stroke cycle during the same rotation of the crankshaft. The power piston of the first cylinder moves in advance of the compression piston of the second cylinder. U.S. Pat. No. 6,880,501 to Suh et al. discloses an internal combustion engine that has a pair of cylinders, each cylinder containing a piston connected to a crankshaft. One cylinder is adapted for intake and compression strokes. The other cylinder is adapted for power and exhaust strokes. U.S. Pat. No. 5,546,897 to Brackett discloses a multi-cylinder reciprocating piston internal combustion engine that can perform a two, four, or diesel engine power cycle.

However, these references fail to disclose how to differentiate cylinder temperatures to effectively isolate the firing (power) cylinders from the compression cylinders and from the surrounding environment. The references further fail to disclose how to minimize mutual temperature influence between the cylinders and the surrounding environment. In addition, the references fail to disclose engine improvements that further raise the temperature of the firing cylinder and lower the temperature of the compression cylinder beyond that of conventional combustion engine cylinders to enhance engine efficiency and performance. Specifically, minimizing temperature of the compression cylinder allows for a reduced compression work investment, while increasing temperature in the power cylinder allows for increased heat regeneration. In addition, the separate cylinders disclosed in these references are all connected by a transfer valve or intermediate passageway of some sort that yields a volume of "dead space" between cylinders, permitting gases to accumulate in between cylinders and further degrading the efficiency of the engine. Additionally, none of these prior art references discussed above teach an opposed or "V" cylinder and crankshaft configuration that minimizes dead space between cylinders while isolating the cylinders to maintain an improved temperature differential between the cylinders.

U.S. Pat. No. 5,623,894 to Clarke discloses a dual compression and dual expansion internal combustion engine. An internal housing containing two pistons moves within an external housing forming separate chambers for compression and expansion. However, Clarke contains a single chamber that executes all of the engine strokes preventing isolation and/or improved temperature differentiation of cylinders such as those disclosed in the present invention.

U.S. Pat. No. 3,959,974 to Thomas discloses a combustion engine comprising a combustion cylinder formed in part of material which can withstand high temperatures in a ringless section containing a power piston and connected to a ringed section maintaining a relatively low temperature containing another piston. However, elevated temperatures in the entire Thomas engine reside not only throughout the combustion and exhaust strokes, but also during part of the compression stroke. Further, Thomas fails to disclose a method of isolating the engine cylinders in an opposed or "V" configuration to permit improved temperature differentiation and discloses an engine containing substantial dead space in the air intake port connecting the cylinders.

In these respects, the DPCE according to the present invention substantially departs from the conventional concepts and designs of the prior art, and in doing so provides a dramatically improved internal combustion engine that is more efficient than conventional internal combustion engines.

SUMMARY OF THE INVENTION

In view of the foregoing disadvantages inherent in the known types of internal combustion engine now present in the prior art, the newly proposed invention provides a DPCE combustion engine utilizing temperature differentiated cylinders that converts fuel into energy or work in a more efficient manner than conventional combustion engines.

In one embodiment of the present invention, a DPCE engine includes a first cylinder coupled to a second cylinder, a first piston positioned within the first cylinder and configured to perform intake and compression strokes, and a second piston positioned within the second cylinder and configured to perform power and exhaust strokes. Alternatively, the first and second cylinders can be considered as a single cylinder having two separate chambers coupled to each other within the single cylinder, wherein the first piston resides in the first chamber and the second piston resides in the second chamber.

In a further embodiment, a DPCE engine further includes an intake valve coupled to the first cylinder, an exhaust valve coupled to the second cylinder and an interstage valve that couples an internal chamber of the first cylinder to an internal chamber of the second cylinder.

In a further embodiment, the engine includes two piston connecting rods, a compression crankshaft, a power crankshaft and two crankshaft connecting rods. The connecting rods connect respective pistons to their respective crankshafts. The compression crankshaft converts rotational movement into reciprocating movement of the first piston. The power crankshaft converts second piston reciprocating movement into engine rotational output movement. The crankshaft connecting rods transfer the power crankshaft rotation into compression crankshaft rotation.

In one embodiment, the intake valve is composed of a shaft having a conic shaped sealing surface, the same as is used in the intake valves in most four stroke engines. The exhaust valve is composed of a shaft having a conic shaped sealing surface, same as used in exhaust valves in most four stroke engines. The interstage valve is composed of a shaft having a conic shaped sealing surface.

In another embodiment, a method of improving combustion engine efficiency includes separating the intake and compression chamber (cool strokes) from the combustion and exhaust chamber (hot strokes), and thus enabling reduced temperature during intake and compression strokes and increased temperature during the combustion stroke, thereby increasing engine efficiency.

In a further embodiment, a method of improving engine efficiency includes minimizing or reducing the temperature during intake and compression strokes. The lower the incoming and compressed air/charge temperature is, the higher the engine efficiency will be.

In yet another embodiment, a method of improving engine efficiency includes regenerating and utilizing exhaust thermal energy.

In a further embodiment, a DPCE engine is provided that greatly reduces external cooling requirements which in turn increases the potential heat available for heat output work conversion during the power stroke, which also burns fuel more efficiently and thereby decreases harmful emissions.

In another embodiment, a method of providing an improved efficiency combustion engine includes performing the intake and compression in a first cylinder and performing the power and exhaust strokes in a second cylinder, wherein the first cylinder is maintained at a cooler temperature than the second cylinder. In a further embodiment, the method also includes injecting the compressed air and fuel mixture from the first cylinder into the second cylinder, thereby cooling the second cylinder.

BRIEF DESCRIPTION OF THE DRAWINGS

FIG. 1 is a simplified cross-sectional side view of a DPCE apparatus, in accordance with one embodiment of the invention, wherein the crankshaft angle is illustrated at 270 degrees.

FIG. 2 is a simplified cross-sectional side view of the DPCE apparatus of FIG. 1, wherein the crankshaft angle is illustrated at 315 degrees.

DETAILED DESCRIPTION OF THE INVENTION

Figure 3:
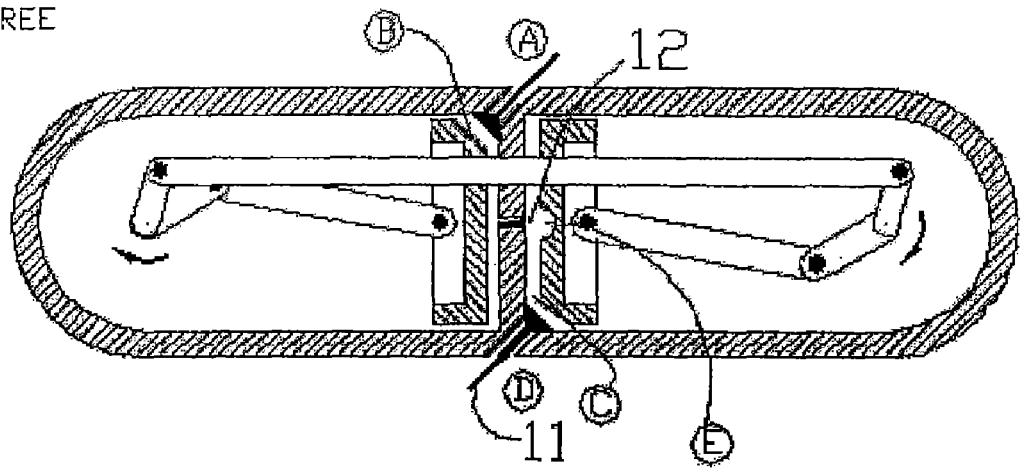
FIG. 3 is a simplified cross-sectional side view of the DPCE apparatus of FIG. 1, wherein the crankshaft angle is illustrated at 330 degrees.

The invention is described in detail below with reference to the figures, wherein similar elements are referenced with similar numerals throughout. It is understood that the figures are not necessarily drawn to scale. Nor do they necessarily show all the details of the various exemplary embodiments illustrated. Rather, they merely show certain features and elements to provide an enabling description of the exemplary embodiments of the invention.

Referring to FIG. 1, in accordance with one embodiment of the invention, a DPCE cylinder includes: a compression cylinder 01, a power cylinder 02, a compression piston 03, a power piston 04, two respective piston connecting rods 05 and 06, a compression crankshaft 07, a power crankshaft 08, a crankshaft connecting rod 09, an intake valve 10, an exhaust valve 11 and an interstage valve 12. The compression cylinder 01 is a piston engine cylinder that houses the compression piston 03, the intake valve 10 and part of the interstage valve 12. The power cylinder 02 is a piston engine cylinder that houses the power piston 04, the exhaust valve 11, part of the interstage valve 12 and a spark plug (not shown) located in front of the surface of power piston 04 facing the combustion chamber in cylinder 02. The compression piston 03 serves the intake and the compression engine strokes. The power piston 04 serves the power and the exhaust strokes. The connecting rods 05 and 06 connect their respective pistons to their respective crankshafts. The compression crankshaft 07 converts rotational movements into compression piston 03 reciprocating movement. The reciprocating movement of the power piston 04 is converted into rotational movement of the power crankshaft 08, which is in turn converted to engine rotational movement or work (i.e., crankshaft 08 serves as the DPCE output shaft). The crankshaft connecting rod 09 translates the rotation of power crankshaft 08 into rotation of the compression crankshaft 07.

In one embodiment, the intake valve 10 is composed of a shaft having a conic shaped sealing surface, the same as is used for intake valves in most conventional four stroke engines. The exhaust valve 11 is composed of a shaft having a conic shaped sealing surface, the same as is used for exhaust valves in most conventional four stroke engines. The interstage valve 12 is also composed of a shaft having a conic shaped sealing surface.

Referring again to FIG. 1, within the compression cylinder 01 inner cavity B is a compression piston 03. The compression piston 03 moves relative to the compression cylinder 01 in the direction as indicated by the illustrated arrows. Within the power cylinder 02 inner cavity C is a power piston 04. The power piston 04 moves relative to the power cylinder 02 in the direction as indicated by the illustrated arrows. The compression cylinder 01 and the compression piston 03 define chamber B. The power cylinder 02 and the power piston 04 define chamber C. In a preferred embodiment, the power piston pressure surface has a shaped hollow cavity 26 (see also FIG. 12) that supplements chamber C and functions as an additional combustion chamber volume during combustion. Chamber B through an interstage mechanical operated valve 12 is in fluid communication with chamber C. Compression cylinder 01 has an intake valve 10. Chamber B through intake valve 10 is in fluid communication with carbureted fuel/air charge A. Power cylinder 02 has an exhaust valve 11. Chamber C through exhaust valve 11 is in fluid communication with ambient air D. When in open position, exhaust valve 11 allows exhaust gases to exhale. During a combustion stroke the power piston 04 pushes the power connecting rod 06, causing the power crankshaft 08 to rotate clockwise. During an exhaust stroke, inertial forces (initiated by flywheel mass—not shown) cause the power crankshaft 08 to continue its clockwise rotation, and cause the power connecting rod 06 to move power piston 04, which in turn exhales burnt fuel exhaust through valve 11. The power crankshaft 08 rotation through a crankshaft connecting rod 09 articulates the compression crankshaft 07 for synchronous rotation (i.e., both crankshafts rotate at the same speed and dynamic angles). In one embodiment, both pistons, the power piston 04 and the compression piston 03 pass through their top dead center (TDC) positions and through their bottom dead center (BDC) positions at the same time. In alternative embodiments, depending on desired timing configurations, the relative positions of the power piston 04 and the compression piston 03 may be phase-shifted by a desired amount. In one embodiment, the DPCE dual cylinder apparatus utilizes conventional pressurized cooling and oil lubrication methods and systems (not shown). Although in embodiments according to the present invention the power chamber C structure components (such as the cylinder 02 and piston 04) maintain a much higher temperature than conventional combustion engines, in one embodiment, the components of the power chamber C are temperature controlled using a cooling system. Moreover, some or all of the components may be fabricated out of high-temperature resistant materials such as ceramics, carbon, or stainless steel. In further embodiments, the DPCE apparatus can utilize well-known high voltage timing and spark plug electrical systems (not shown) as well as an electrical starter motor to control spark plug ignitions, timing, and engine initial rotation.

Figure 4:
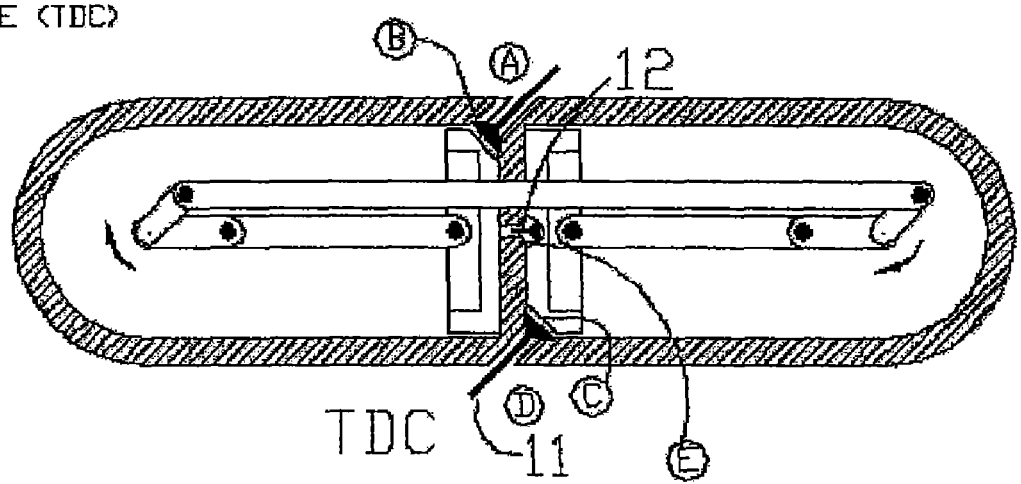
FIG. 4 is a simplified cross-sectional side view of the DPCE apparatus of FIG. 1, wherein the crankshaft angle is illustrated at 0 degrees.
Figure 5:
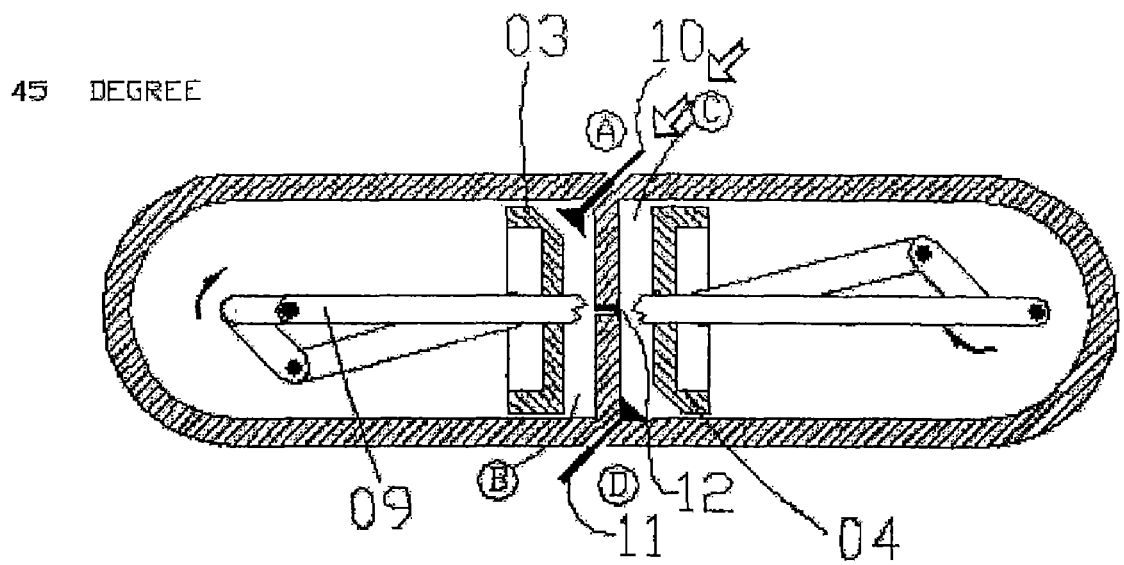
FIG. 5 is a simplified cross-sectional side view of the DPCE apparatus of FIG. 1, wherein the crankshaft angle is illustrated at 45 degrees.
Figure 6:
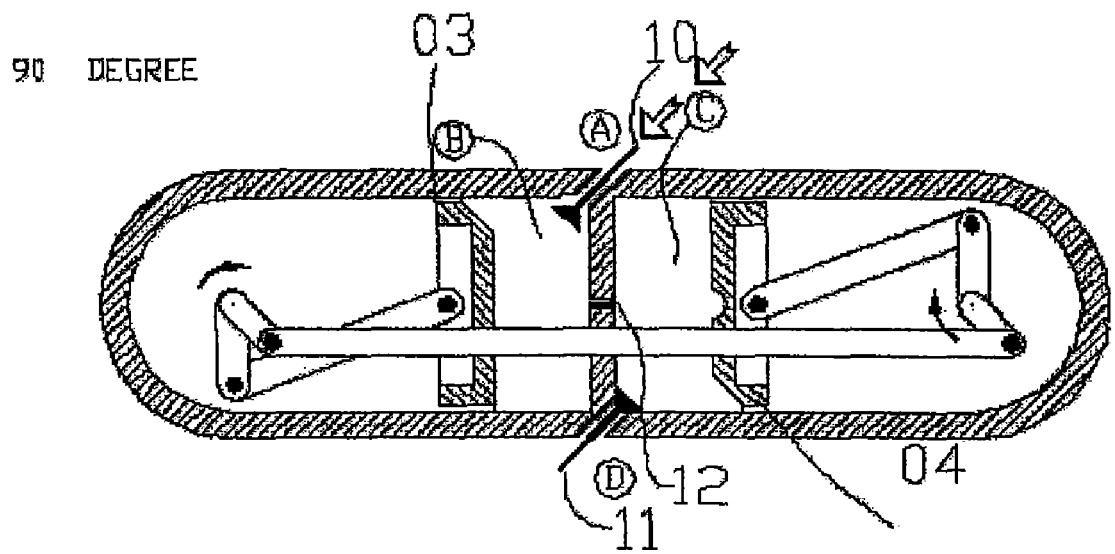
FIG. 6 is a simplified cross-sectional side view of the DPCE apparatus of FIG. 1, wherein the crankshaft angle is illustrated at 90 degrees.
Figure 7:
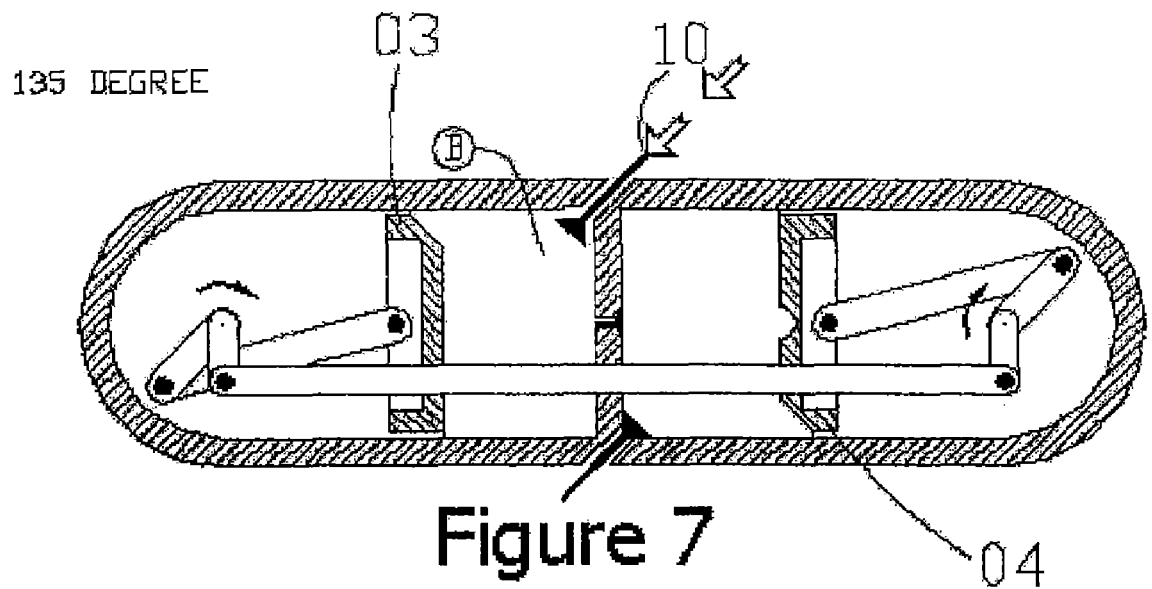
FIG. 7 is a simplified cross-sectional side view of the DPCE apparatus of FIG. 1, wherein the crankshaft angle is illustrated at 135 degrees.
Figure 8:
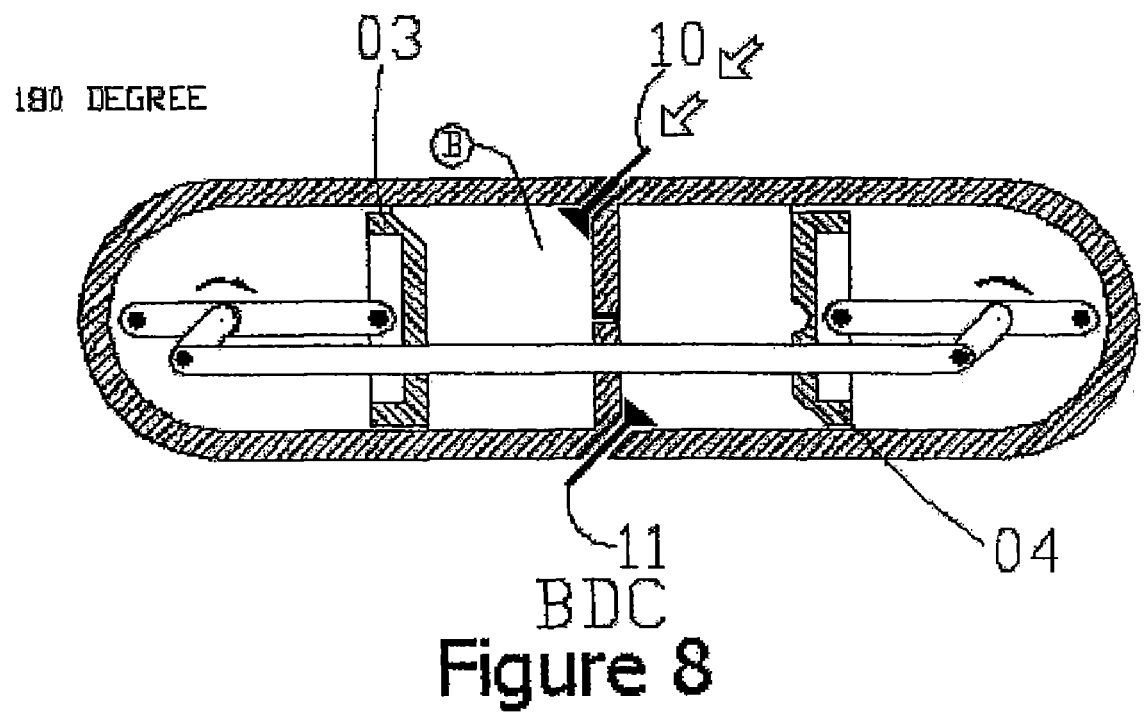
FIG. 8 is a simplified cross-sectional side view of the DPCE apparatus of FIG. 1, wherein the crankshaft angle is illustrated at 180 degrees.
Figure 9:
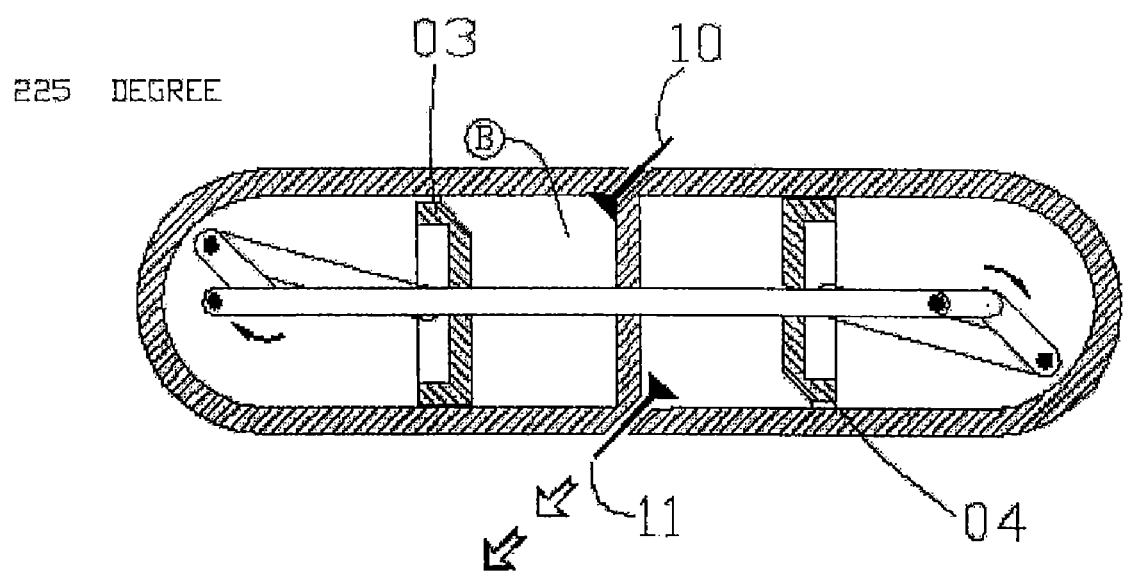
FIG. 9 is a simplified cross-sectional side view of the DPCE apparatus of FIG. 1, wherein the crankshaft angle is illustrated at 225 degrees.

As illustrated in FIGS. 1 through 9, as an electrical starter engages DPCE output shaft 6' (FIG. 15), both crankshafts 07 and 08 start their clockwise rotation and both pistons 03 and 04 begin their reciprocating motion. As illustrated in FIG. 5, the compression piston 03 and the power piston 04 move in the direction that increases chamber B and chamber C volume. Since intake valve 10 is in its open position and because at this stage chamber B volume constantly increases, carbureted fuel or fresh air charge (when using a fuel injection system) flows from point A (which represents carburetor output port, for example) through intake valve 10 into chamber B. As shown in FIGS. 6 through 8, respectively, chamber B volume increases while fuel-air charge flows in. As compression piston 03 reaches its BDC point, intake valve 10 closes trapping chamber B air-fuel charge content. While crankshafts clockwise rotation goes on, and as shown in FIG. 9 and FIG. 1 through 3 respectively, chamber B volume decreases and its now trapped air-fuel charge temperature and pressure increases. As the compression piston 03 approaches a predetermined point (FIG. 3), interstage valve 12 opens and chamber B air-fuel charge flows into chamber C. As the compression piston approaches its TDC point (according to some embodiments some delay or advance may be introduced), the interstage valve 12 simultaneously closes and a spark plug firing occurs.

FIGS. 5 through 8 illustrate the power stroke. As combustion occurs chamber C pressure increases forcefully pushing power piston 04 which in turn moves connecting rod 06 to rotate power crankshaft 08, which is coupled to a DPCE output shaft 06'. Meanwhile, as compression piston 03 is pushed back from its TDC position, intake valve 10 reopens allowing a new air fuel charge A to be sucked into chamber B.

The exhaust stroke begins when power piston 04 reaches its BDC point (FIG. 8). The exhaust valve 11 opens and as chamber C volume decreases the burned exhaust gases are pushed out from chamber C through open exhaust valve 11 into the ambient environment D.

Thus, the DPCE engine divides the strokes performed by a single piston and cylinder of convention combustion engines into two thermally differentiated cylinders in which each cylinder executes half of the four-stroke cycle. A "cold" cylinder executes the intake and compression strokes and a thermally isolated "hot" cylinder executes the combustion and exhaust strokes. Compared to conventional engines, this innovative system and process enables the DPCE engine to work at higher combustion chamber temperatures and at lower intake and compression chamber temperatures. Utilizing higher combustion temperatures while maintaining lower intake and compression temperatures reduces engine cooling requirements, lowers compression energy requirements and thus boosts engine efficiency. Additionally, thermally isolating the power cylinder from the external environment limits external heat losses, allows the reuse of the same heat energy in the next stroke, and burns less fuel in each cycle.

Figure 10:
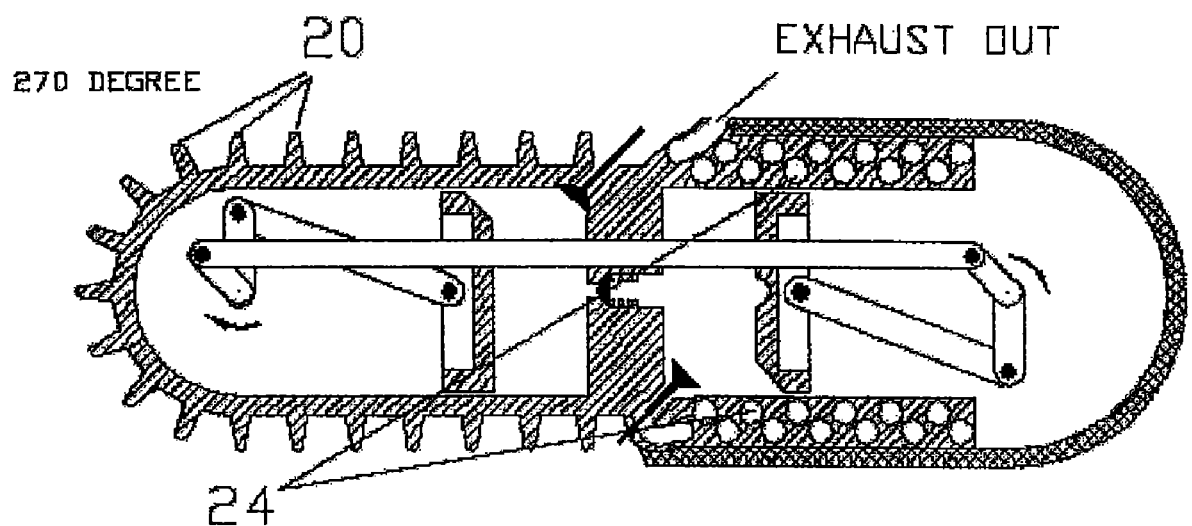
FIG. 10 is a simplified cross-sectional side view of a DPCE apparatus having an air-cooled compression cylinder and an exhaust-heated power cylinder, in accordance with one embodiment of the invention.
Figure 11:
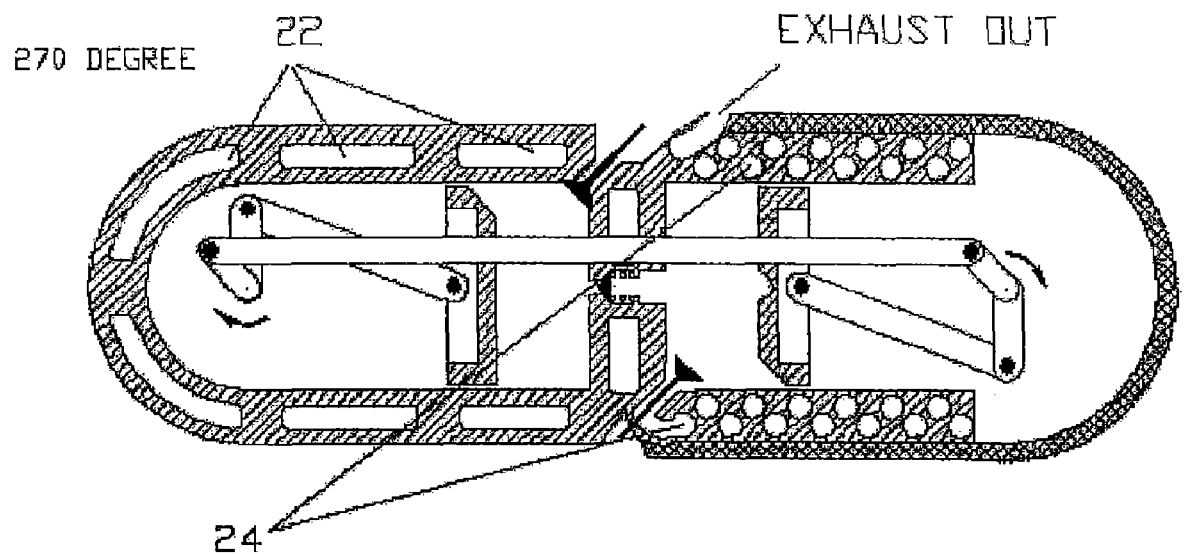
FIG. 11 is a simplified cross-sectional side view of a DPCE apparatus having a water-cooled compression chamber and an exhaust-heated power chamber, in accordance with one embodiment of the invention.
Figure 26:
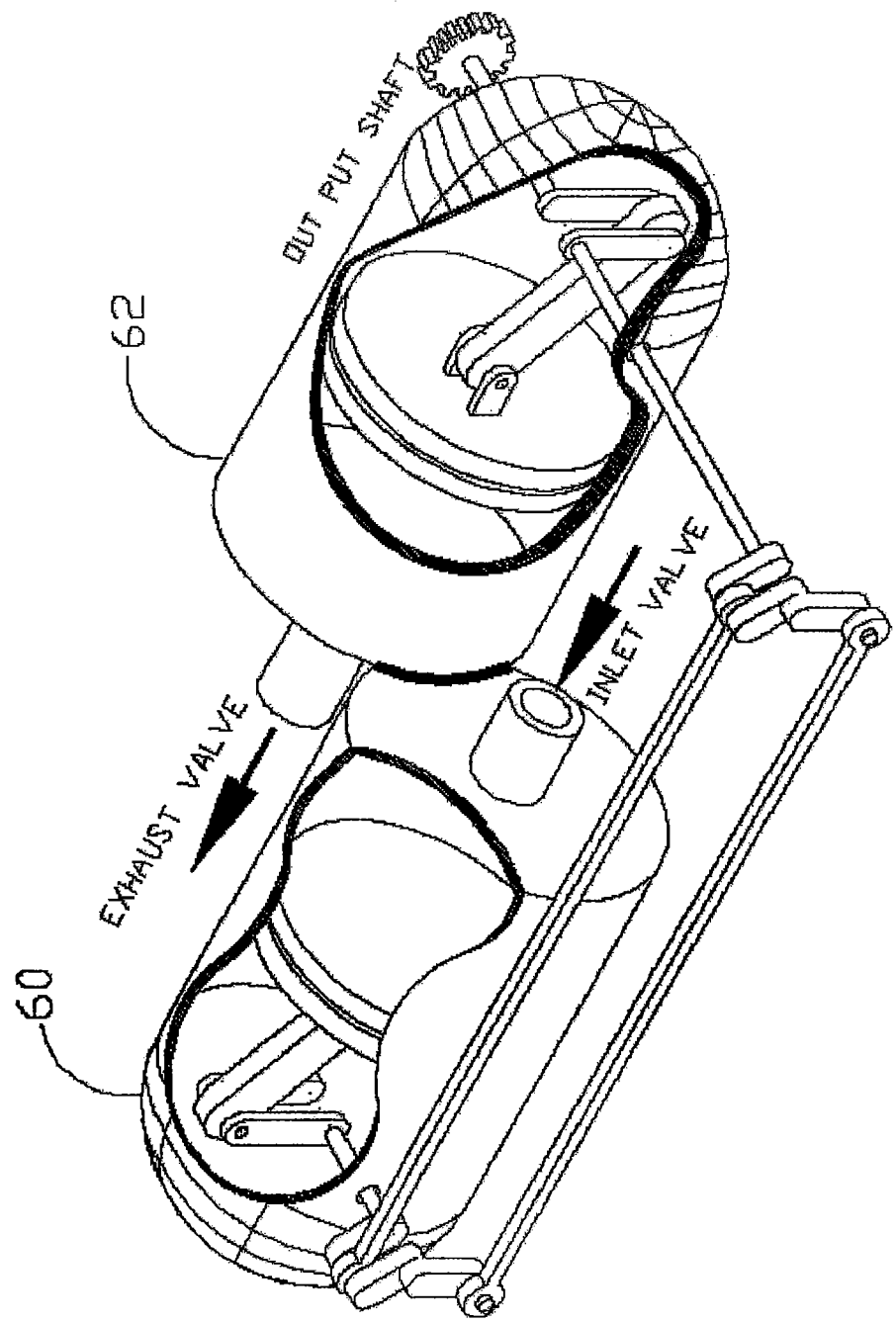
FIG. 26 is a simplified 3D illustration of a DPCE apparatus having the compression cylinder and the power cylinder on different planes, in accordance with one embodiment of the invention.

In one embodiment, the compression cylinder 01 is similar to a conventional piston engine cylinder that houses the compression piston 03, the intake valve 10, and part of the interstage valve 12. The compression cylinder 01 works in conjunction with the compression piston 03 to suck and compress incoming air and/or fuel charge. In a preferable embodiment the compression cylinder is cooled. FIG. 10 shows an air cooled compression cylinder having heat absorbing and radiating ribs 20. FIG. 11 shows a liquid cooled compression cylinder having liquid coolant passages 22. In preferred embodiments, the cooling air source or the liquid coolant sources can be the same as well known in the previous art. In a preferable embodiment, the compression cylinder 01 and the power cylinder 02 should be thermally isolated from each other, as well as the surrounding environment. FIG. 26 illustrates an embodiment in which the two cylinders are constructed in dissimilar planes, and thus, exercise minimum reciprocal conductivity between the cylinders.

Figure 12:
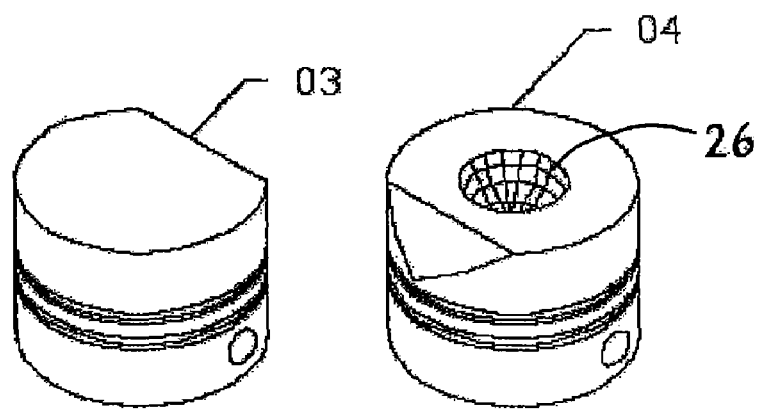
FIG. 12 is a 3-Dimensional (3D) simplified illustration of the DPCE compression and power pistons, in accordance with one embodiment of the invention.

The power cylinder 02 is a piston engine cylinder that houses the power piston 02, the exhaust valve 11, part of the interstage valve 12, and a spark plug (not shown). The power cylinder 02 functions in conjunction with the power piston 04 to combust a compressed air/fuel mixture within a chamber of the cylinder 02 and transfer the resulting energy as mechanical work to the power crankshaft 08. During the second half of its reciprocating movement cycle, the power piston 04 works to exhale or push the exhaust gases out from the cylinder 02 via the exhaust valve 11. The power cylinder 02 accommodates a spark-plug located in front of the surface of power piston 04 facing the combustion chamber in cylinder 02. As shown in FIG. 12, in one embodiment, the power piston 04 has a shaped hollow cavity 26, which serves as a combustion chamber. During the exhaust stroke, the power piston 04 pushes the burned gases out of the cylinder 02 via exhaust valve 11.

In one preferred embodiment, the power cylinder 02 is exhaust heated, in addition to being externally thermally isolated. FIGS. 10 and 11 illustrate exhaust heat utilization as exhaust gases, during their exhale stream, conduct heat into power cylinder heating passages 24.

As explained above, the compression connecting rod 05 connects the compression crankshaft 07 with the compression piston 03 causing the piston 03 to move relative to the cylinder in a reciprocating motion. The power connecting rod 06 connects the power crankshaft 08 with the power piston 04. During the combustion phase, the power connecting rod 06 transfers the piston 04 movement into the power crankshaft 08 causing it to rotate. During the exhaust phase, the power crankshaft 08 rotation and momentum pushes the power piston 04 back toward the compression cylinder 01, which causes the burned gases to be exhaled via the exhaust valve (exhaust stroke).

Figure 13:
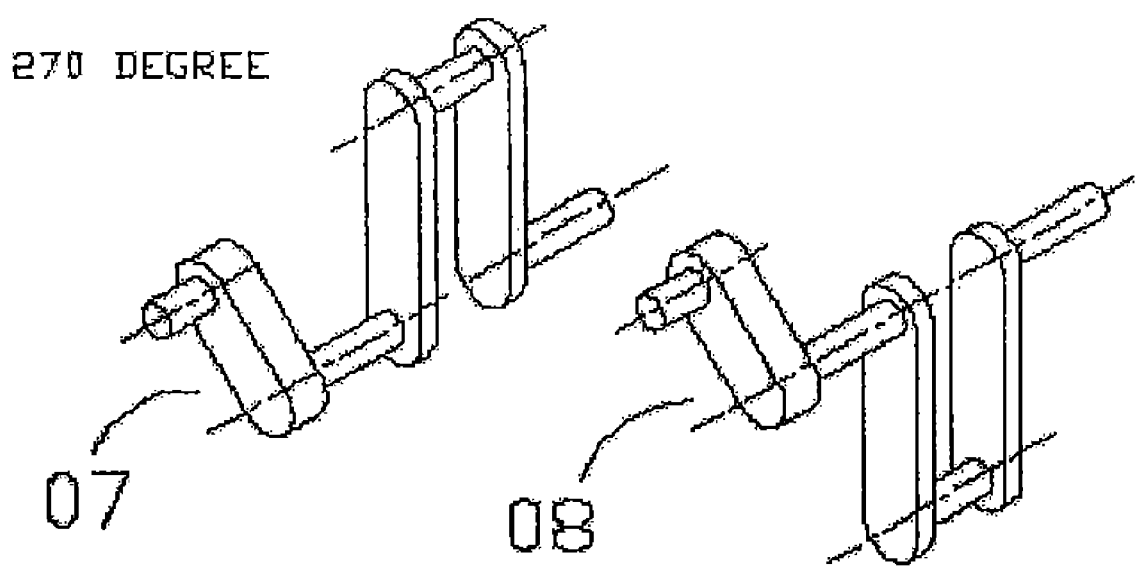
FIG. 13 is a 3D simplified illustration of the DPCE compression and power crankshafts, in accordance with one embodiment of the invention.

Referring to FIG. 13, the compression crankshaft 07 converts rotational movement into compression piston 03 reciprocating movement. The compression crankshaft 07 connects the compression connecting rod 05 (FIG. 1) with the crankshaft connecting rod 09. Movement of the crankshaft connecting rod 09 causes the compression crankshaft 07 to rotate. Compression crankshaft 07 rotations produce movement of the compression connecting rod 05 that in turn moves the compression piston 03 relative to its cylinder housing 01 in a reciprocating motion.

Figure 14:
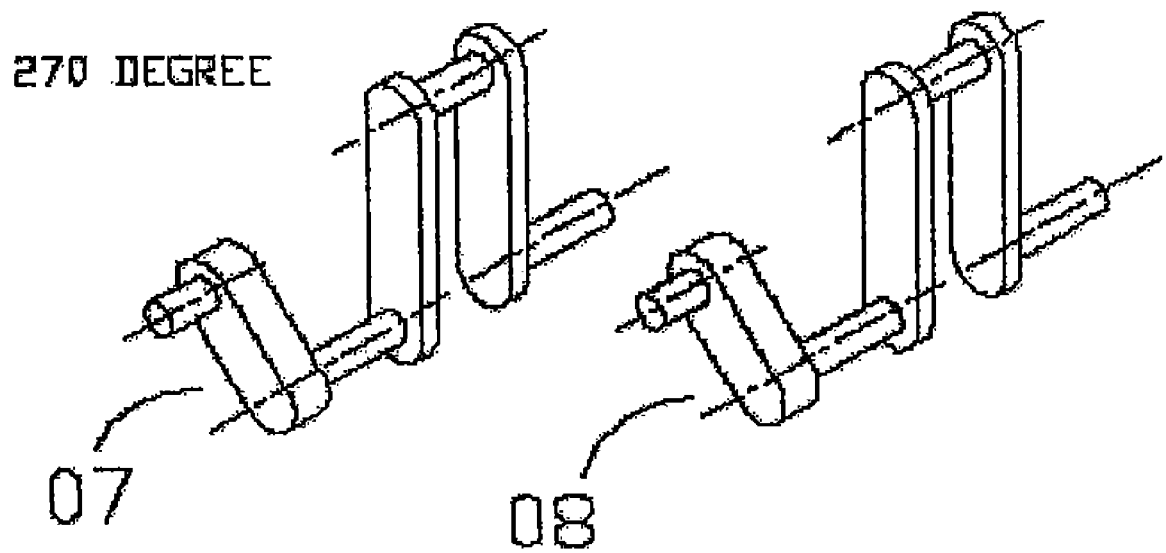
FIG. 14 is a 3D simplified illustration of the DPCE compression and power crankshafts, in accordance with one embodiment of the invention.

In various embodiments of the invention, the compression crankshaft 07 and power crankshaft 08 structural configuration may vary in accordance with desired engine configurations and designs. For example, some crankshaft design factors are: number of dual cylinders, relative cylinder positioning, crankshaft gearing mechanism, and direction of rotation. For example, if the compression crankshaft 07 and the power crankshaft 08 rotate in the same direction, the axes of the crankshafts 07 and 08 should be positioned 180 degrees from each other, as illustrated in FIG. 13. Alternatively, if the compression and power crankshafts 07 and 08, respectively, rotate in opposite directions, both crankshaft axes should be positioned in phase with respect to one another, as shown in FIG. 14.

The power crankshaft 08 connects the power connecting rod 06 with the crankshaft connecting rod 09. As combustion occurs, the power piston 04 movement, through its power connecting rod 06, causes the power crankshaft 08, which is also coupled to the engine output shaft (not shown), to rotate, which causes the connecting rod 09 to rotate the compression crankshaft 07 and generate reciprocal movement of the compression piston 03.

Figure 15:
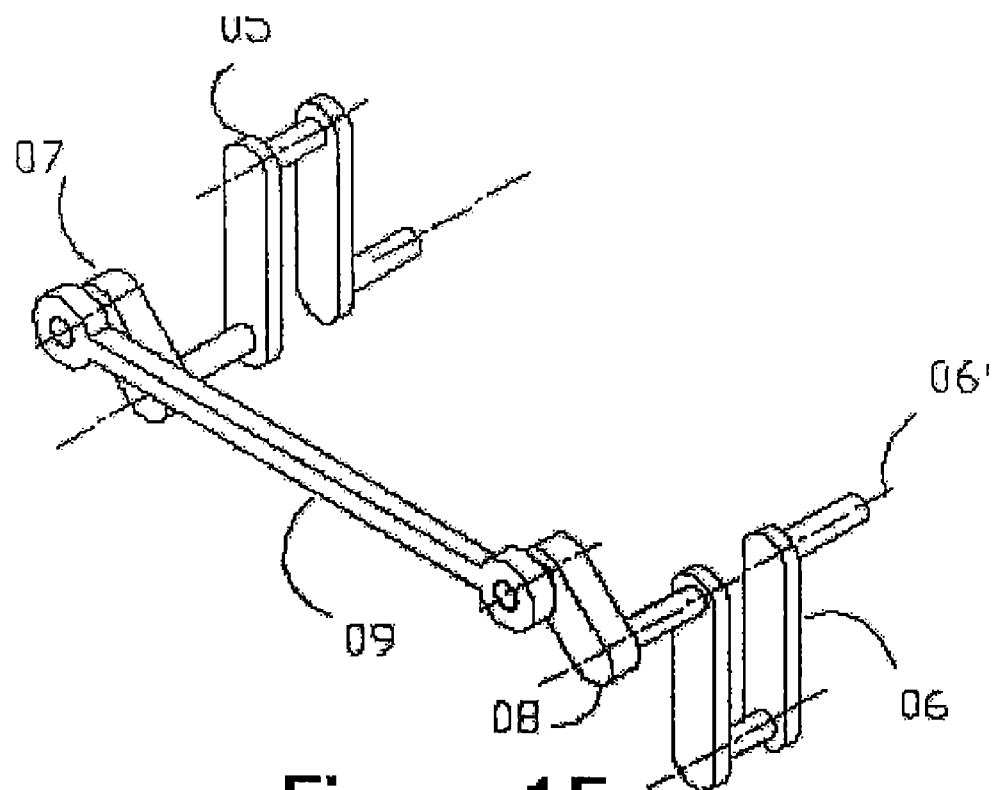
FIG. 15 is a 3D simplified illustration of a DPCE crankshafts system, illustrating a crankshaft connecting rod, in accordance with one embodiment of the invention.

The crankshaft connecting rod 09 connects the power crankshaft 08 with the compression crankshaft 07 and thus provides both crankshafts with synchronous rotation. FIG. 15 illustrates a perspective view of the crankshaft connecting rod 09 coupled to respective crankshafts 07 and 08, in accordance with one embodiment of the invention. The function of the crankshaft connecting rod 09 is to link the power crankshaft 08 and the compression crankshaft 07. In certain designs, both crankshafts 07 and 08 may rotate synchronously and respectively relative to each other (same direction, same angle). In other designs the two crankshafts 07 and 08 may rotate in opposite directions with or without a predetermined phase angle.

Figure 17:
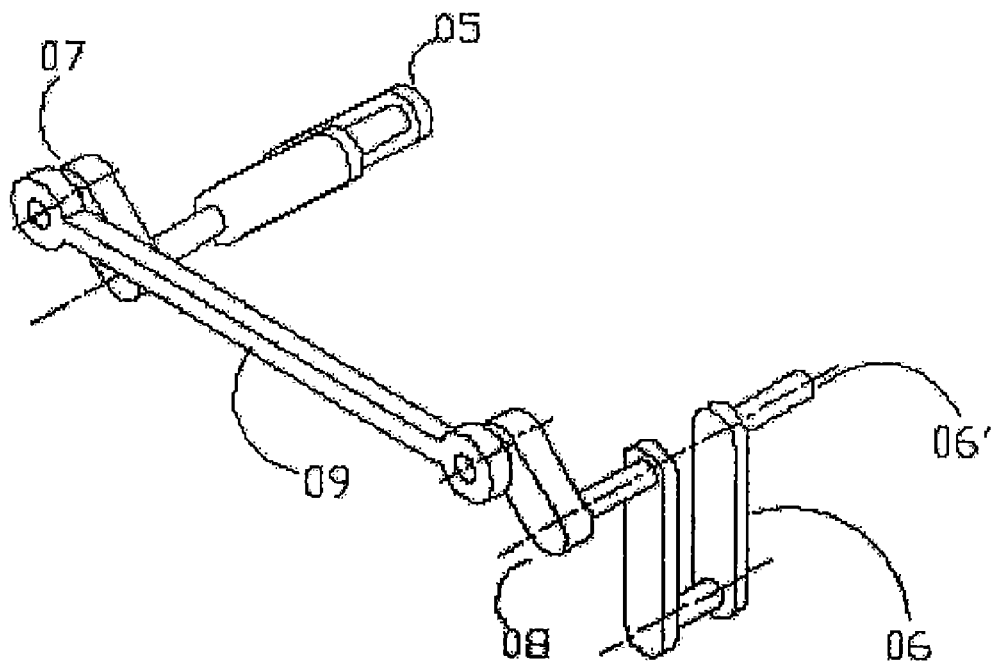
FIG. 17 is a 3D simplified illustration of a DPCE crankshaft system, illustrating dissimilar crankshaft angles, in accordance with one embodiment of the invention.

FIG. 17 illustrates perspective view of the connecting rod 09 coupled to respective crankshafts 07 and 08, which are in turn coupled to respective piston connecting rods 05 and 06, wherein the crankshafts 07 and 08 are oriented with respect to each other so as to provide a predetermined phase difference between the otherwise synchronous motion of the pistons 03 and 04. A predetermined phase difference means that in order to achieve a time difference between the compression piston TDC position, as illustrated in FIG. 4, and the power piston TDC position, a relative piston phase delay or advance can be introduced into either piston. FIG. 17 illustrates that the piston connecting rods 05 and 06 are out of phase with respect to each other so as to provide a desired phase delay or advance between the times the pistons 03 and 04 reach their respective TDC positions. In one embodiment, a phase delay is introduced such that the piston of the power cylinder moves slightly in advance of the piston of the compression cylinder, permitting the compressed charge to be delivered under nearly the full compression stroke and allowing the power piston to complete a full exhaust stroke. Such advantages of phase delays with the power piston leading the compression piston are also described in U.S. Pat. No. 1,372,216 to Casaday and U.S. Pat. Application No. 2003/0015171 A1 to Scuderi. In an alternative embodiment, an opposite phase delay is introduced such that the compression piston moves in advance of the power piston, wherein the power piston further compresses the charge from the compression cylinder before firing. The benefits of this approach are discussed in U.S. Pat. No. 3,880,126 to Thurston et al. and U.S. Pat. No. 3,959,974 to Thomas.

Figure 16:
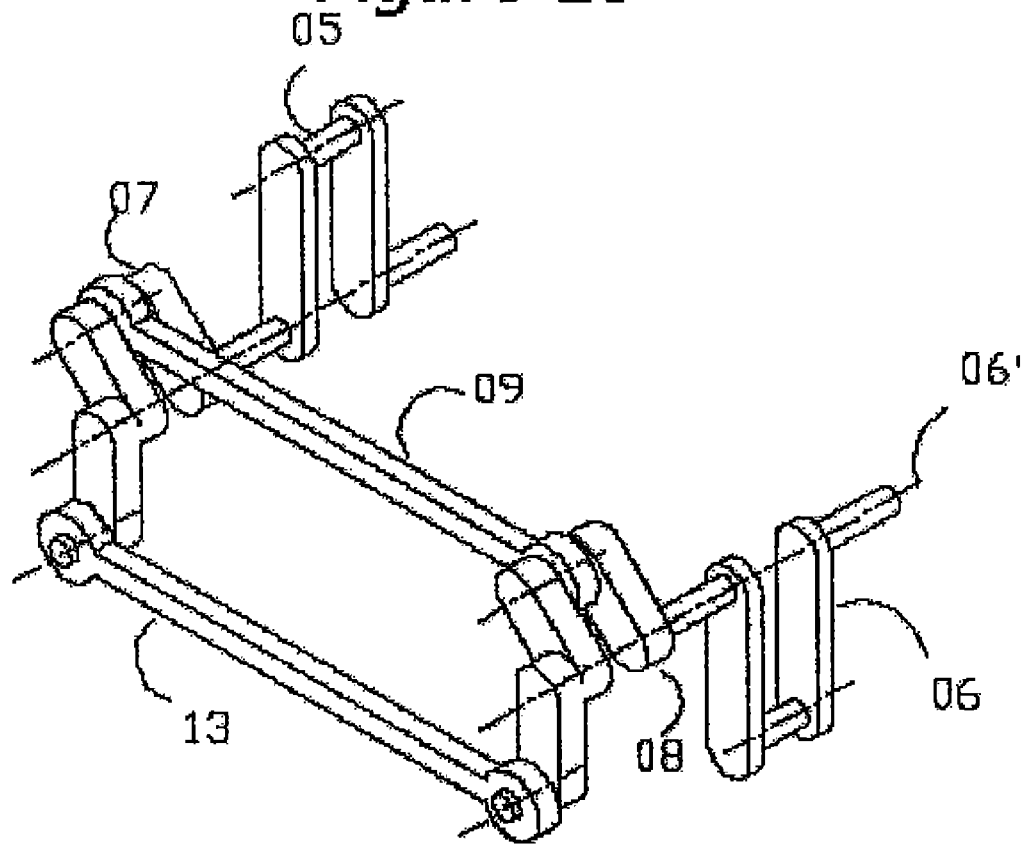
FIG. 16 is a 3D simplified illustration of a DPCE crankshaft system, having two crankshaft connecting rods, in accordance with one embodiment of the invention.

In an additional embodiment, in order to enforce proper direction of rotation of the compression crankshaft 07 and the power crankshaft 08, a second crankshaft connecting rod 13 is utilized as shown in FIG. 16.

Figure 18:
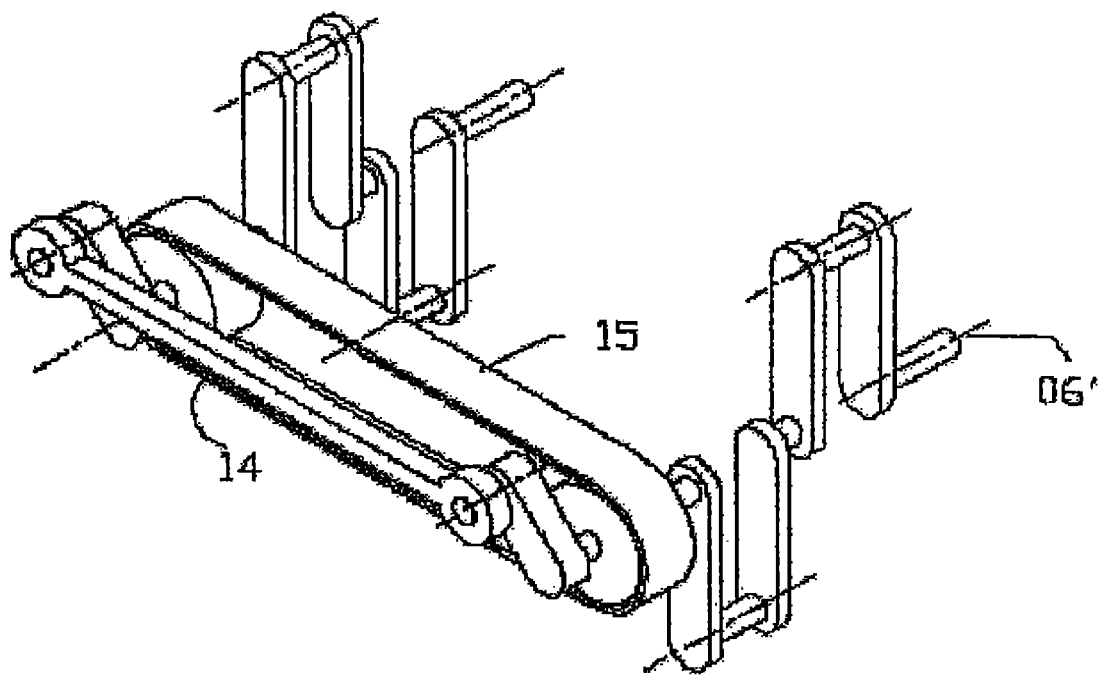
FIG. 18 is a 3D simplified illustration of a DPCE crankshaft system, having one crankshaft connecting rod in combination with a timing belt (or a chain or a V-shaped belt), in accordance with one embodiment of the invention.
Figure 19:
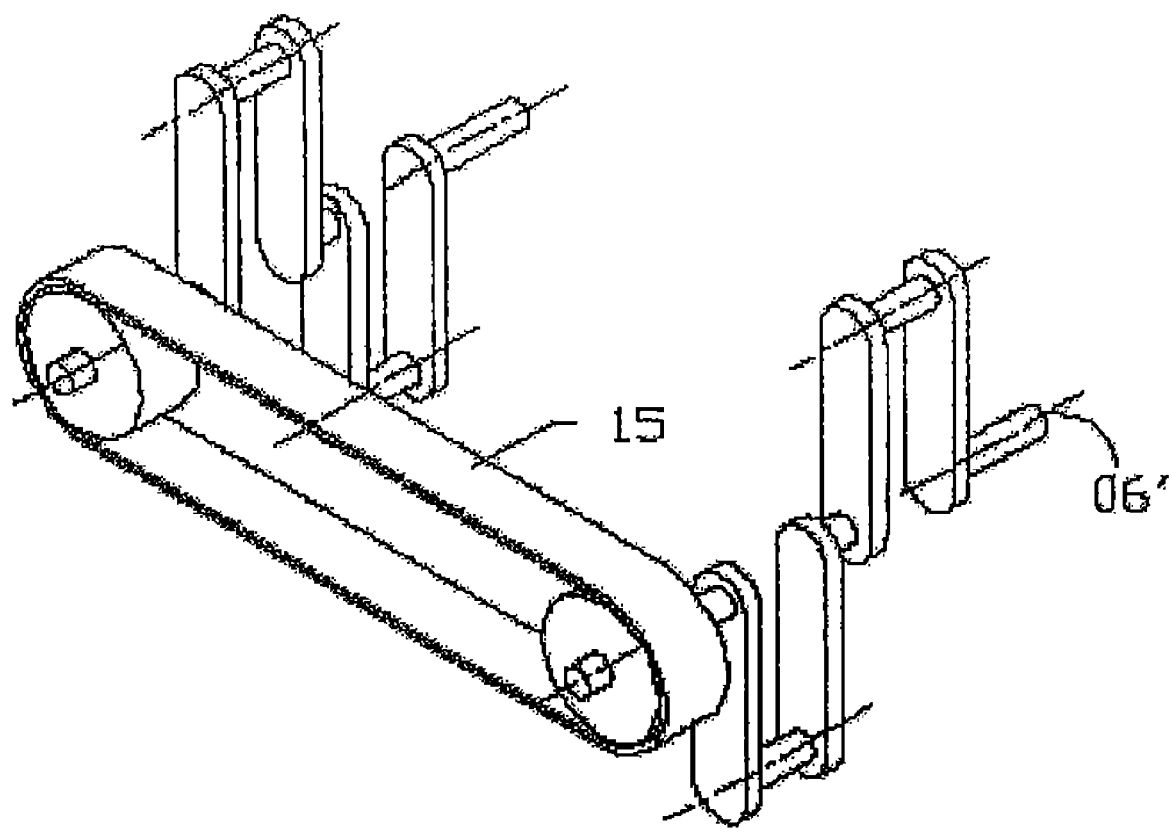
FIG. 19 is a 3D simplified illustration of a DPCE crankshaft system having solely a timing belt (or a chain or a V-shaped belt), in accordance with one embodiment of the invention.

Referring to FIG. 18, an alternative means to establish the direction of rotation of the crankshafts 07 and 08, may be implemented by having one crankshaft connecting rod 14 combined with a timing belt or a chain mechanism 15. As illustrated in FIG. 19, in another embodiment, a chain mechanism or a timing belt mechanism 15 may by itself serve as an alternative to any of the above-mentioned crankshaft connecting mechanisms.

Figure 20:
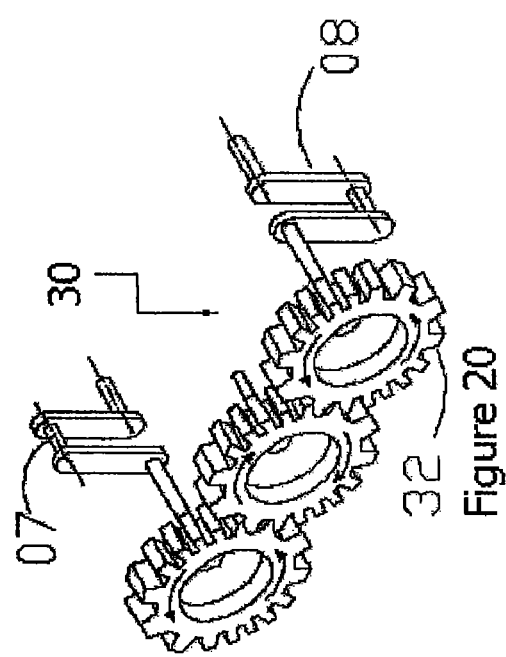
FIG. 20 is a 3D simplified illustration of a DPCE crankshaft system, having crankshaft gear wheels as the connecting mechanism, in accordance with one embodiment of the invention.
Figure 21:
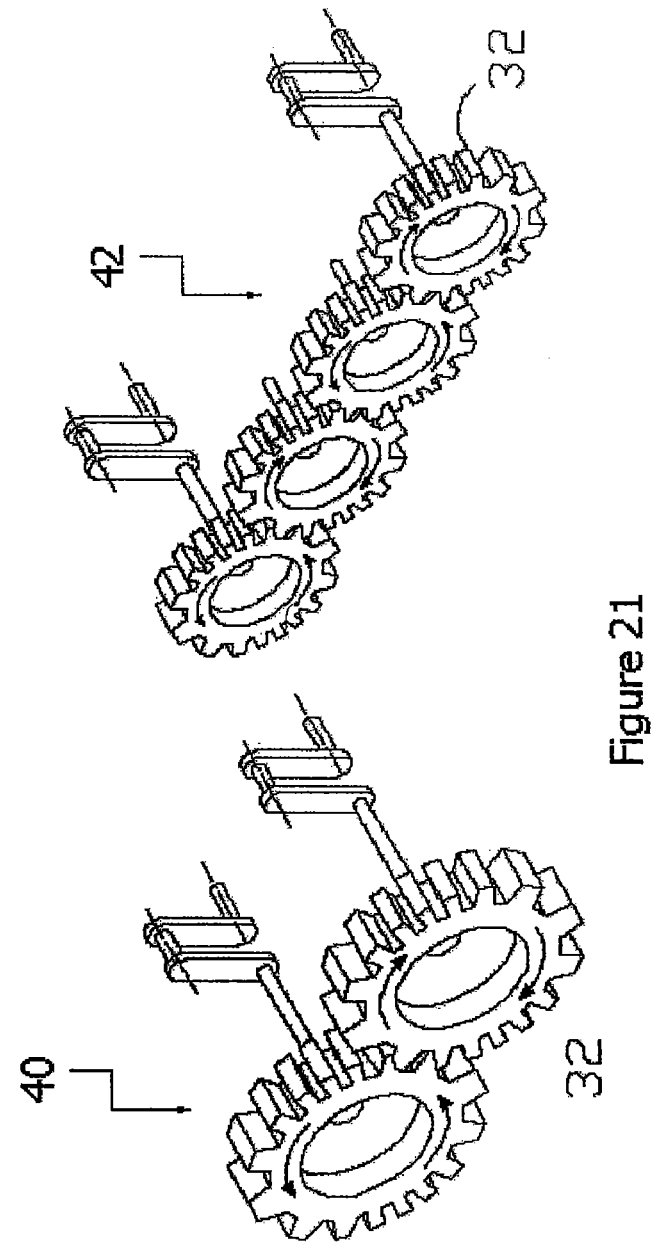
FIG. 21 is a 3D simplified illustration of a DPCE crankshaft system, having crankshaft gear wheels as the connecting mechanism, in accordance with another embodiment of the invention.

FIGS. 20 and 21 illustrate alternative mechanisms to replace the crankshaft connecting rod 09. FIG. 20 illustrates crankshafts connecting gearwheels mechanism 30, comprising three gearwheels 32 engaged to each other. In this embodiment, both crankshafts 07 and 08 rotate in a unilateral direction (utilizing 3 gearwheels). FIG. 21 shows two embodiments of a crankshaft connecting gearwheels mechanisms 40 and 42 having an even number of gearwheels 32, thereby configured to turn crankshafts 07 and 08 in opposite directions.

In one embodiment, the intake valve 10 is composed of a shaft having a conic shaped sealing surface, the same as is used as intake valves in most four stroke engines. The intake valve 10 governs the ambient air or the carbureted air/fuel charge as they flow into the compression cylinder 01. The compression cylinder 01 has at least one intake valve. In preferred embodiments, relative to the compression pistons 03 momentary position, the intake valve location, function, timing and operation may be similar or identical to the intake valves of conventional four strokes internal combustion engines.

In one embodiment, the exhaust valve 11 is composed of a shaft having a conic shaped sealing surface, the same as is used in exhaust valves in most four stroke engines. The exhaust valve 11, located on the power cylinder 02 governs burned gaseous exhale flow. The power cylinder 02 has at least one exhaust valve. In preferred embodiments, the exhaust valve location, functions, timing and operation method may be similar or identical to exhaust valves found in well-known conventional four stroke combustion engines.

Figure 22:
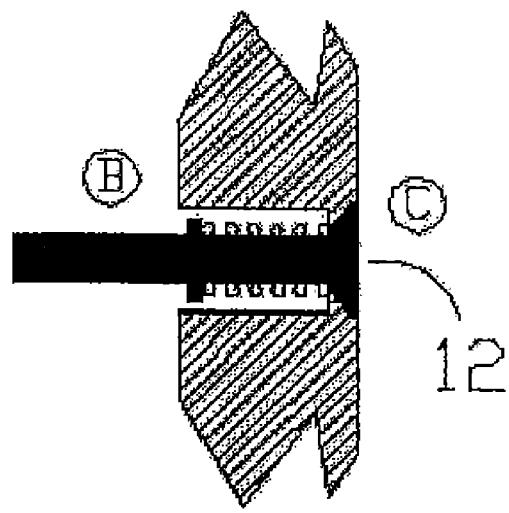
FIG. 22 is a simplified cross-sectional view of an interstage valve, in accordance with one embodiment of the invention.

Referring to FIG. 22, in one embodiment, the interstage valve 12 is composed of a shaft having a conic shaped sealing surface. The interstage valve governs the compressed air flow or the compressed carbureted air/fuel charge (collectively referred to herein as "fuel" or "fuel mixture") flow from a volume B within the compression cylinder 01 as it is pushed into a volume C within the power cylinder 02. The interstage valve 12 also prevents any reverse flow of fuel from volume C back into volume B. When in an open position, the interstage valve 12 enables compressed fuel to flow from the compression cylinder 01 into the power cylinder 02. During combustion and along the power stroke, the interstage valve 12 remains closed. In one embodiment, the interstage valve operation mechanism may be similar or identical to well-known combustion engine inlet or exhaust valve mechanisms. The closed or opened position of the interstage valve 12 is operated by mechanical linkages coupling or engagement with one of the dynamic DPCE shafts/parts (e.g., piston 03). It should also be understood that the exact valve timing depends on many engineering design considerations; however, as a general rule the interstage valve 12 should open around the time the exhaust valve 11 closes and remain closed during the power stroke and at least most of the exhaust stroke.

Figure 23:
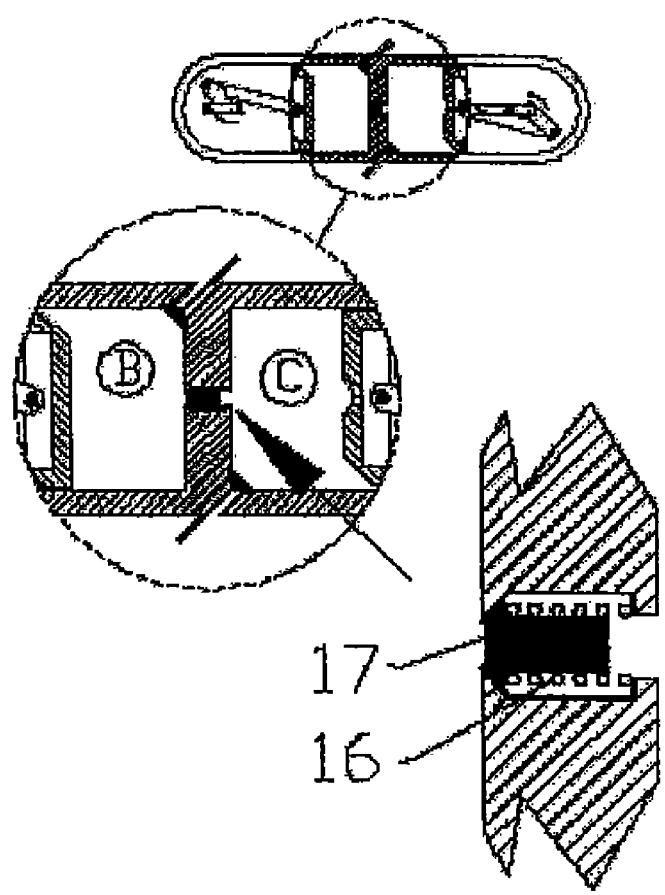
FIG. 23 is a simplified interstage relief valve cross-sectional illustration, in accordance with one embodiment of the invention.

Referring to FIG. 23, in another embodiment, a preloaded spring-operated relief valve 17 serves as the interstage valve 12. This embodiment provides an automatic valve that does not require any linkage based operating mechanism. During the intake and work strokes the working pressure and the preloaded spring 16 forces the valve stem 17 to remain closed and sealed. During the compression and exhaust strokes, the increased compressed fuel pressure in volume B along with the decreased exhaust pressure in volume C overcome the valve preloaded spring 16 forces and thus opens the valve stem 17, thereby allowing the compressed fuel to flow into the power cylinder 02 chamber C.

Figure 24:
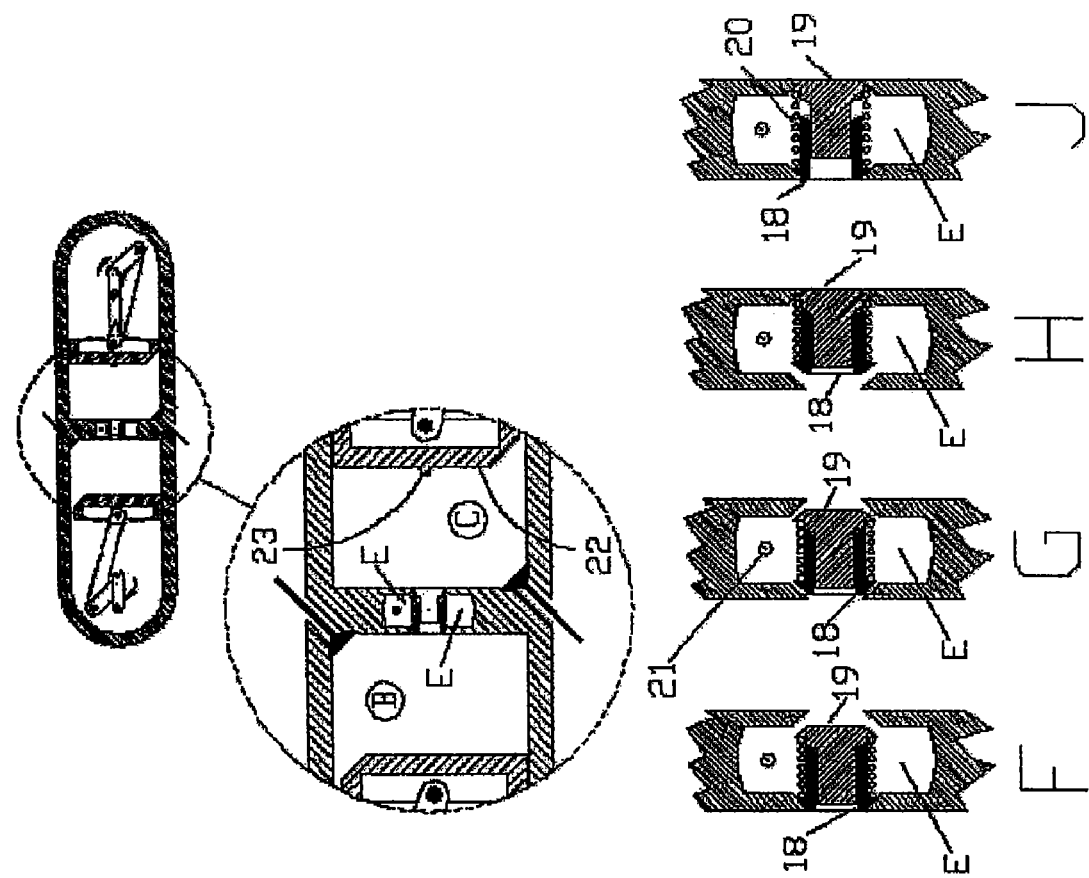
FIG. 24 is a simplified cross-sectional illustration of a semi automatic interstage valve, in accordance with one embodiment of the invention.

FIG. 24 illustrates a combination of a combustion chamber E with a unique semi automatic interstage valve comprising valve 18 having a cylindrical or ring portion that surrounds a plug valve 19. In this embodiment a combustion chamber E is sealed from the compression chamber B by the valve 18 and sealed from the working chamber C by valve 19. A spring 20 pushes simultaneity both valves 18 and 19 toward their corresponded closed positions. A spark plug 21 is located inside the combustion chamber E cavity. The combustion chamber E and interstage valve operation is as follows: As illustrated at stage J, during initial compression and exhaust strokes, spring 20 pushes valve stem 18 and valve stem 19 causing both valves to stay in a sealed closed position. At stage H, as the compression stroke progresses, its compressed air/charge pressure raises and in a certain stage the rising pressure, acting on valve 18, overcomes the spring 20 preload force, thereby forcing valve 18 to open and the compressed air/charge flows into combustion chamber E. At stage G, when the compression and work pistons approach their TDC positions, spark plug 21 is fired and a protruding portion 23 of the power piston 22 mechanically engages valve 19 forcing it to move and unseal (open) valve 19 that in turn engages and pushes valve 18 toward its closed position. Additionally, the rising combustion volume pressure works in conjunction with the power piston to force valve 18 to close. At stage F, when combustion occurs, chamber E pressure drastically and immediately rises, valve 18 is already closed and the hot combustion stream flows through valve 19 pushing power piston 22 away from the valve 19.

As the power piston 22 retreats back (during the power stroke), valve 19 stays open because of the differential pressure which exists between chamber C high combustion pressure vis-à-vis the much lower pressure that resides in chamber B which is now in its intake phase. The combustion chamber and interstage valve cycle ends as the power stroke ends. Spring 20 then pushes back valve 19 to its closed position as the power piston 22 begins its exhaust stroke.

Figure 25:
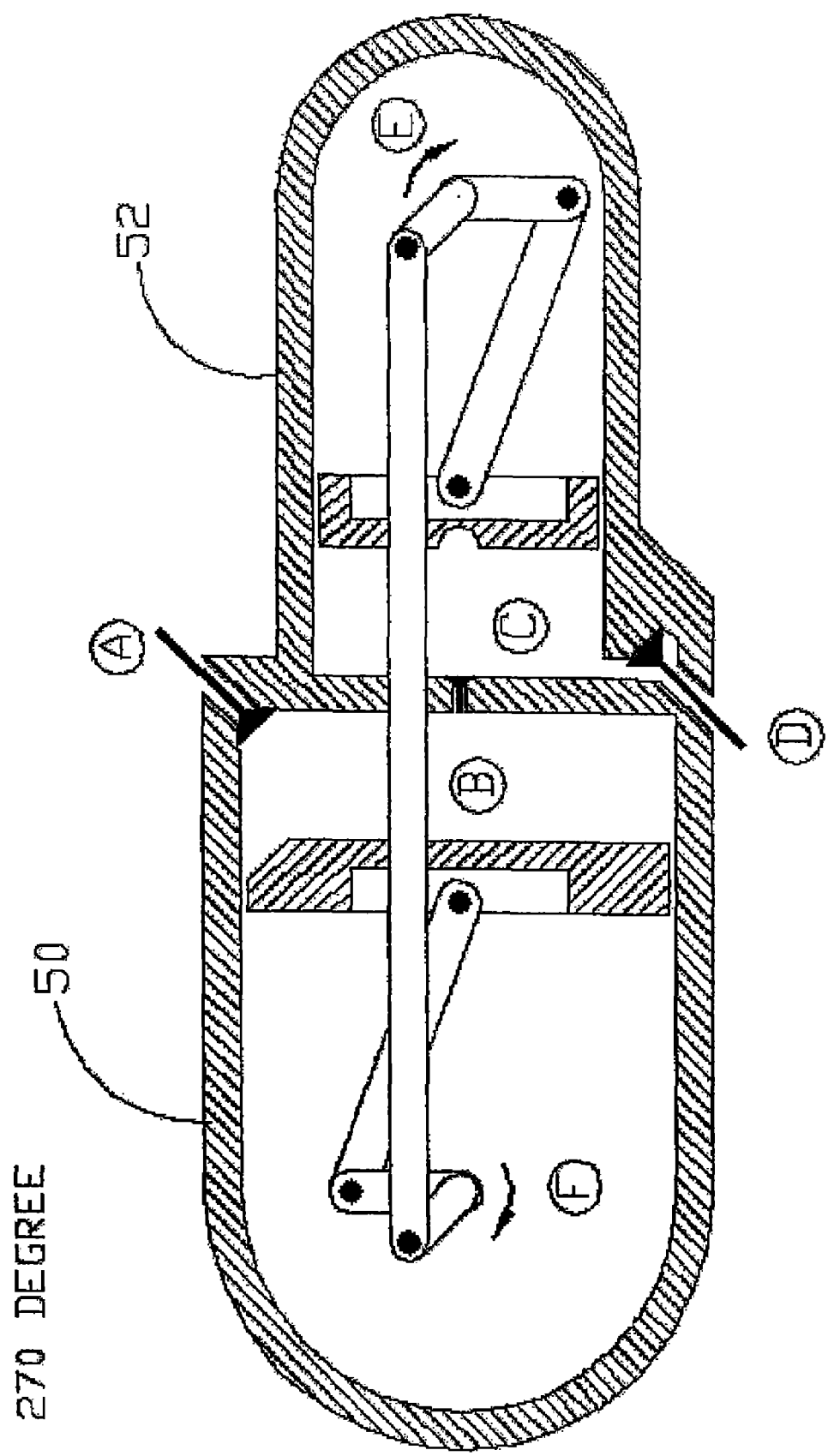
FIG. 25 is a simplified cross-section illustration of a DPCE apparatus having supercharge capabilities, in accordance with one embodiment of the invention.

FIG. 25 illustrates a DPCE dual cylinder configuration having supercharge capabilities, in accordance with one embodiment of the invention. As shown in FIG. 25, the compression cylinder portion 50 is larger than the power cylinder portion 52, therefore allowing a greater volume of air/fuel mixture to be received and compressed in the compression chamber B. At the completion of the compression stroke, the larger volume and increased pressure of compressed air/fuel mixture (i.e., "supercharged" fuel mixture) in the compression chamber B is injected into the combustion chamber C via interstage valve 12. Therefore, a greater amount and/or higher pressure of fuel mixture can be injected into the combustion chamber C of power cylinder 52 to provide a bigger explosion and, hence, more energy and work, during the power stroke.

As mentioned above, FIG. 26 illustrates an alternative DPCE dual cylinder configuration, in accordance with one embodiment of the invention, wherein the compression cylinder 60 is offset from the power cylinder 62, to provide minimal thermal conductivity between the two cylinders. In this embodiment, the interstage valve 12 is located in the small area of overlap between the two cylinders.

Figure 27:
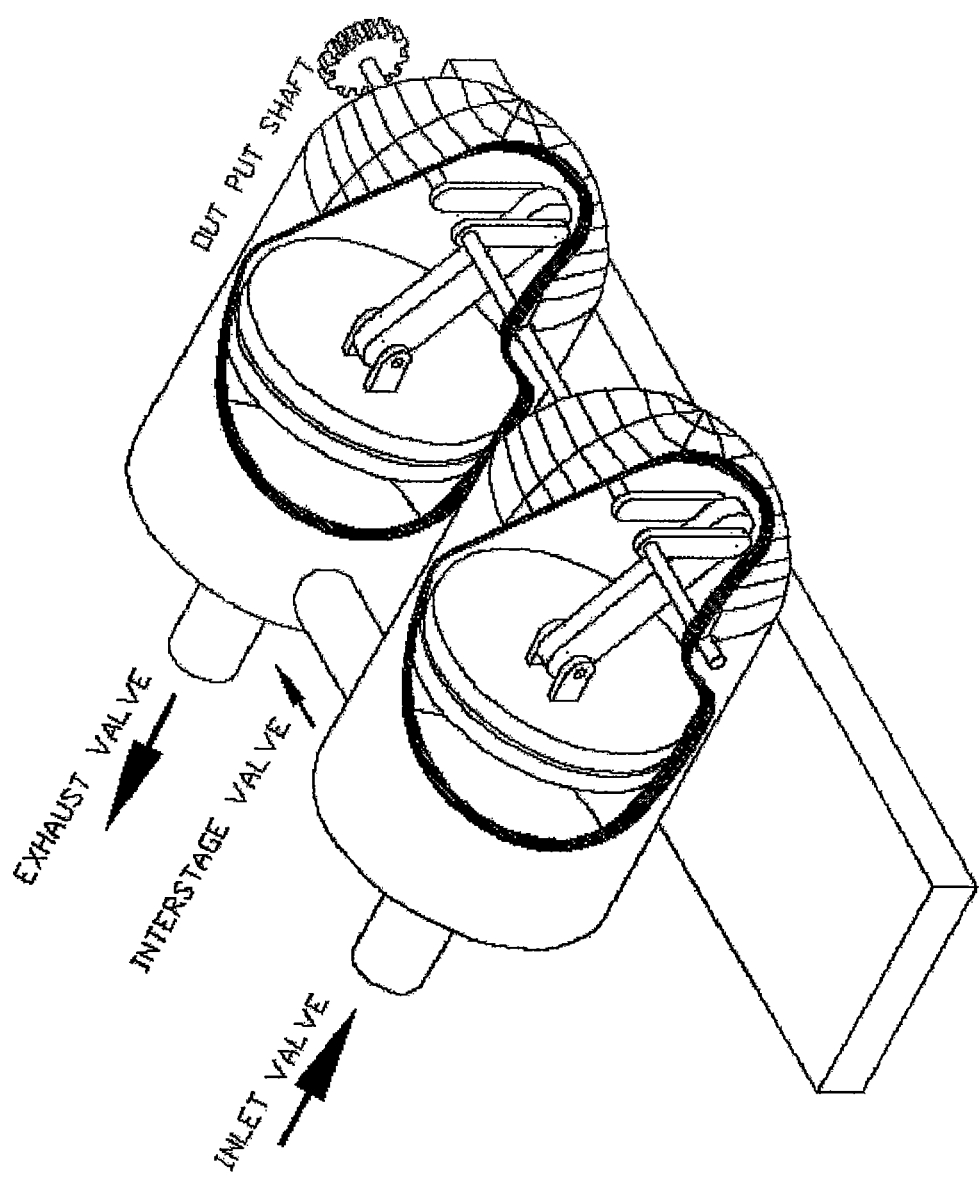
FIG. 27 is a simplified 3D illustration of a DPCE apparatus in which both cylinders are parallel to each other and both pistons move in a tandem manner, in accordance with one embodiment of the invention.

FIG. 27 illustrates a DPCE dual cylinder configuration in which both cylinders are constructed parallel to each other and both pistons are moving in a tandem manner, in accordance with a further embodiment of the invention. In this embodiment, the intake, exhaust, and interstage valves may operate in the same manner as described above. However, as shown in FIG. 27, the interstage valve is located in a lateral conduit that couples the first and second cylinders.

While various embodiments of the invention have been illustrated and described, those of ordinary skill in the art will appreciate that the above descriptions of the embodiments are exemplary only and that the invention may be practiced with modifications or variations of the devices and techniques disclosed above. Those of ordinary skill in the art will know, or be able to ascertain using no more than routine experimentation, many equivalents to the specific embodiments of the invention described herein. Such modifications, variations, and equivalents are contemplated to be within the spirit and scope of the invention as set forth in the claims below.

What is claimed is:

1. A dual piston apparatus for use in a combustion engine, comprising:
    a first cylinder housing a first piston therein, wherein the first piston performs intake and compression strokes, but does not perform an exhaust stroke;
    a second cylinder housing a second piston therein, wherein the first and second pistons move toward each other in substantially collinear directions to reach respective top dead center positions, wherein the second piston performs combustion and exhaust strokes, but does not perform an intake stroke; and
    an interstage valve located between the first and second cylinders so as to fluidly couple an internal chamber of the first cylinder to an internal chamber of the second cylinder.

2. The apparatus of claim 1 further comprising:
    a first crankshaft coupled to the first piston;
    a second crankshaft coupled to the second piston; and
    a crankshaft connecting mechanism coupled to the first and second crankshafts and configured to translate motion between the first and second crankshafts.

3. The apparatus of claim 2 wherein the crankshaft connecting mechanism comprises a crankshaft connecting rod having first and second ends coupled to the first and second crankshafts, respectively.

4. The apparatus of claim 2 wherein the crankshaft connecting mechanism comprises a plurality of gear wheels, wherein a first gear wheel is coupled to the first crankshaft, a second gear wheel is coupled to the second crankshaft, and the first and second gear wheels are mechanically coupled to each other.

5. The apparatus of claim 2 wherein the crankshaft connecting mechanism comprises a drive belt or chain coupled to the first and second crankshafts.

6. The apparatus of claim 1 wherein the first and second pistons move simultaneously in-phase with one another within their respective first and second cylinders.

7. The apparatus of claim 1 wherein the first and second pistons move simultaneously out of phase with one another within their respective first and second cylinders.

8. The apparatus of claim 7 wherein the second piston moves out of phase slightly in advance of the first piston.

9. The apparatus of claim 7 wherein the first piston moves out of phase slightly in advance of the second piston.

10. The apparatus of claim 1 wherein an internal volume of the first cylinder is greater than an internal volume of the second cylinder.

11. The apparatus of claim 1 wherein the second piston comprises a chamber formed therein that functions as a combustion chamber.

12. The apparatus of claim 1 wherein the first and second cylinders are thermally isolated from one another.

13. The apparatus of claim 1, wherein the first and second cylinders are fluidly coupled to minimize dead space between the first and second cylinders.

14. A dual piston apparatus for use in a combustion engine, comprising:
    a first cylinder housing a first piston therein, wherein the first piston performs intake and compression strokes, but does not perform an exhaust stroke;

a second cylinder housing a second piston therein, wherein the second piston performs combustion and exhaust strokes, but does not perform an intake stroke, wherein the first and second pistons move toward each other in substantially collinear directions to reach respective top dead center positions;

an interstage valve that couples an internal chamber of the first cylinder to an internal chamber of the second cylinder; and wherein the first cylinder is thermally isolated from the second cylinder and the first cylinder is maintained at a cooler temperature than the second cylinder during operation.

15. The apparatus of claim 14 wherein the first cylinder comprises a plurality of air cooling ribs located on an external surface of the first cylinder.

16. The apparatus of claim 14 wherein the first cylinder comprises a plurality of liquid cooling passages within its housing.

17. The apparatus of claim 14 wherein the second cylinder comprises a plurality of exhaust heating passages for utilizing heat provided by exhaust gases expelled by the second piston to further heat the second cylinder.

18. The apparatus of claim 14 wherein the first and second cylinders are located parallel and in tandem to each other such that at least a portion of a top surface of the first cylinder is adjacent to and fluidly coupled to at least a portion of a top surface of the second cylinder.

19. The apparatus of claim 14 wherein the first and second cylinders are positioned to form a V configuration and the interstage valve is located in an area of spatial overlap between the first and second cylinders.

20. The apparatus of claim 14 wherein said second cylinder is thermally isolated from the surrounding environment so as to reduce leakage of thermal energy from the second cylinder.

21. The apparatus of claim 14, wherein the first and second cylinders are fluidly coupled to minimize dead space between the first and second cylinders.

\* \* \* \* \*